United States Patent [19]

Stone

[11] 4,363,742
[45] Dec. 14, 1982

[54] METHOD AND APPARATUS FOR MAKING BATTERY PASTE

[75] Inventor: Milton Stone, Chicago, Ill.

[73] Assignee: Pettibone Corporation, Chicago, Ill.

[21] Appl. No.: 160,221

[22] Filed: Jun. 17, 1980

[51] Int. Cl.³ .................... H01M 4/88; F16K 31/00
[52] U.S. Cl. ............................. 252/182.1; 422/114; 422/111; 364/502; 366/17; 366/132; 366/151
[58] Field of Search .................. 252/182.1; 422/109, 422/111, 114, 117, 225; 364/500, 502; 366/17, 40, 132, 152, 151; 137/90, 92; 73/54; 23/230 A

[56] References Cited

U.S. PATENT DOCUMENTS

| | | | |
|---|---|---|---|
| 2,701,210 | 2/1955 | Fisher et al. | 23/230 A |
| 3,397,571 | 8/1968 | Hartel | 73/54 |
| 3,576,675 | 12/1968 | Abramson et al. | 252/182.1 |
| 4,027,859 | 6/1977 | Stone | 137/88 |
| 4,098,494 | 7/1978 | Howlett | 252/182.1 |

FOREIGN PATENT DOCUMENTS 2819847  5/1977  Fed. Rep. of Germany .......... 73/54

Primary Examiner—Tim R. Miles
Assistant Examiner—Chris Konkol
Attorney, Agent, or Firm—Gerlach, O'Brien & Kleinke

[57] ABSTRACT

Control apparatus and a method for making battery paste by mixing selected quantities of lead oxide, sulfuric acid and water to form a reaction mixture are disclosed. During the reaction portion of the process, the viscosity of the mixture initially descends on a time-viscosity curve, which then changes in slope to reach a point of minimum viscosity. The temperatures of the reaction mixture form a time-temperature curve having a temperature peak therein. The temperature and the viscosity of the reaction mixture are determined respectively by temperature sensing devices and by viscosity sensing devices. In response to the temperature of the reaction mixture rising to a predetermined temperature or above as determined by the temperature sensing devices and to the viscosity thereof being at or above a predetermined value as determined by the viscosity sensing devices, coincidence devices actuate a valve controlled water supply to add a quantity of water to the reaction mixture, until the viscosity thereof is reduced to a value below the predetermined value. The predetermined temperature corresponds approximately to at least one of (a) a temperature at which a predetermined time-viscosity curve reaches a point adjacent to the minimum viscosity, and (b) a temperature at a point on a predetermined time-temperature curve which corresponds to said predetermined time-viscosity curve, a point adjacent to and below its peak. The water content of the reaction mixture is adjusted thereby, as needed, so as to approximate the water content desired in the final product.

15 Claims, 4 Drawing Figures

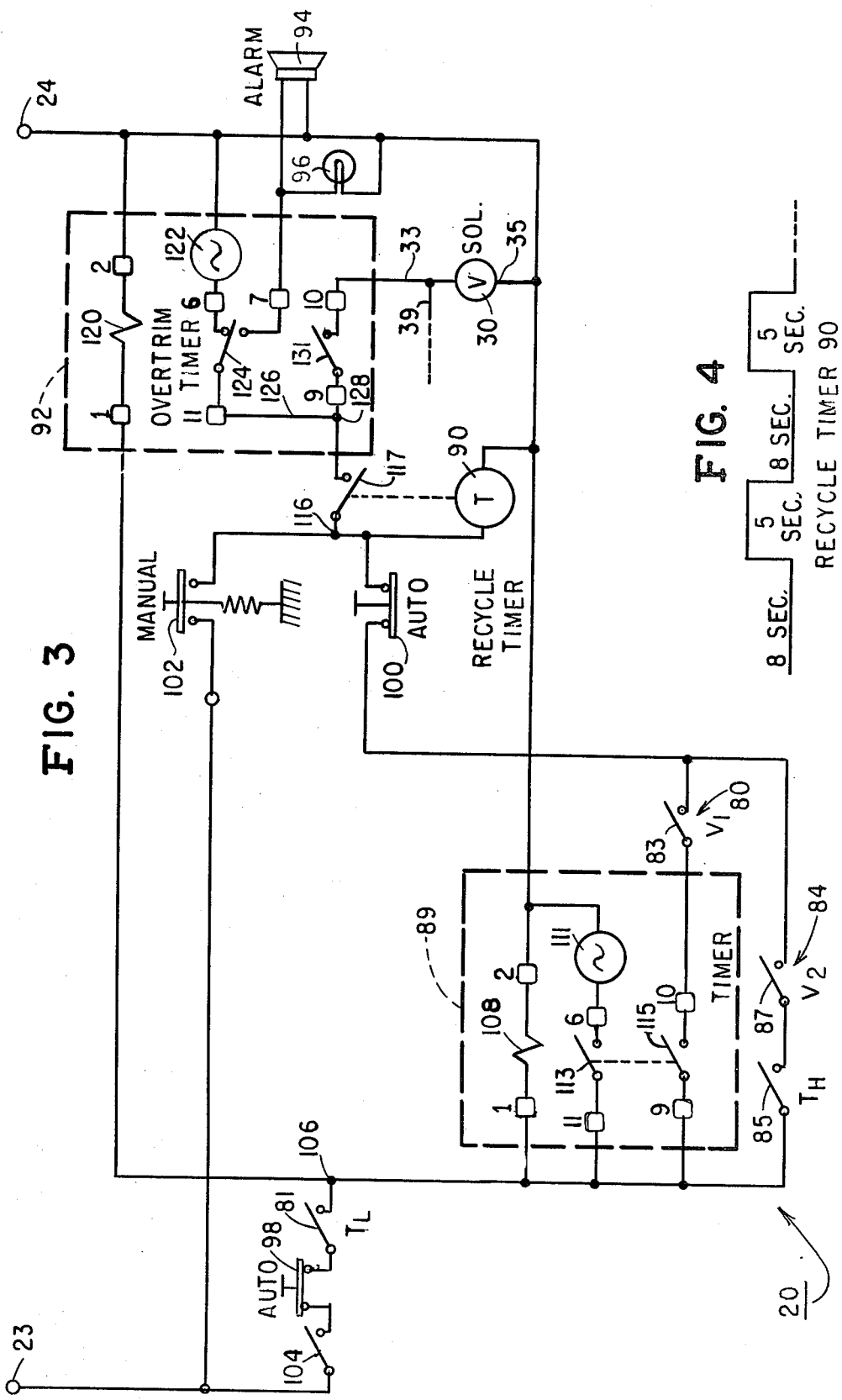

METHOD AND APPARATUS FOR MAKING BATTERY PASTE

BACKGROUND OF THE INVENTION

The present invention relates in general to a method and apparatus for making a storage battery paste for the plates of electric batteries and more particularly relates to such method and control apparatus which facilitate greatly the production of the proper mixture of materials to achieve desired physical and chemical properties of the resulting battery paste.

A lead oxide mixture conventionally is used as a storage battery paste for the plates of electric batteries. Briefly, the process of making the battery paste includes the initial mixing in a power mixer of selected quantities of dry lead oxide, water and sometimes additives to form a viscous mixture. Once the water and lead oxide mixture is thoroughly dispersed, a measured quantity of sulfuric acid is added to the viscous mixture to be dispersed therein, thereby gradually rendering the reaction mixture less viscous in consistency. As the acid increasingly reacts with the other materials of the mixture, the consistency of the mixture continues to decrease to a point of minimum viscosity and then increases therefrom to completion of the process.

During this process of making battery paste, the temperature of the mixture rises to a peak and thereafter falls gradually therefrom. The temperatures of the mixture are controlled so that the temperatures are permitted to rise to a desired high temperature to enable the reaction to take place in a satisfactory manner for a desired battery paste formulation. The control of the temperature of the mixture is achieved by circulating ambient air through the mixture, by using heat exchanging water jackets for the mixer and by controlling the speed of the acid addition. Also, the heat of the reaction and the ambient air passing through the mixer causes water to vaporize from the mixture, thereby cooling the mixture.

After the reaction and cooling of a batch of battery paste, if the quality and the quantity of all of the materials forming the battery paste mixture were within acceptable limits, then the physical and chemical properties of the final product will also be within acceptable limits. Two of these properties are specific gravity and viscosity. The value of the specific gravity of the final product is determined by conventional testing equipment. Similarly, in accordance with industry practices, viscosity of the final product is tested by measuring with a penetrometer the value of plasticity, which value is inversely proportional to and thus provides an indication of the viscosity of the battery paste mixture.

While the quality and the quantity of the materials forming the mixture can be ordinarily controlled within limits, the quantity of water in the final product is subject to variation. Since the viscosity of the final product is dependent upon its water content, the viscosity is also subject to variation from batch to batch. A larger than desired quantity of water in the final battery paste mixture causes it to have a consistency which exhibits a lower than desirable viscosity (high plasticity value); whereas, a smaller than desired quantity of water causes the final mixture to be too viscous (low plasticity value). Excessive variations in the water content in the final product are to a great extent due to temperature changes in the ambient conditions and due to granular size differences of the lead oxide.

During the day, ambient temperature changes are caused by normal temperature changes of the air and the water used for cooling purposes and of the materials to be used in the process. Also, the temperature of the mixer used in the process varies throughout the day. In this regard, after a few batches, the temperature of an empty mixer ordinarily stabilizes at a temperature which is a few degrees lower than the discharge temperature of the battery paste, but the temperature of the mixer changes when the mixer ceases to operate due to a malfunction of other equipment associated therewith, or other reasons, such as process adjustments.

The variations of water content in the final product resulting from ambient temperature changes can ordinarily be compensated for by admitting controllably "trim" water to the final product, either manually or automatically, until the viscosity is reduced to a desired value. For a disclosure of a certain automatic apparatus and methods for adding the trim water at the completion of a battery paste making process, reference may be made to U.S. Pat. No. 4,027,859.

However, excessive variations in final product water content can result when both ambient temperature changes as well as lead oxide granular size differences occur at the same time to compound the problem. Lead oxide granular size can vary greatly depending on the manufacturer, or on the oxidizing process, or both, even though the different oxides may be within close chemical tolerances. The differences in granular size cause varying amounts of process water to be evaporated during the mixing cycles of the process. For similar weights, coarse grains have less surface exposure than fine grains, and, therefore, when wetted and heated, especially when cooling air is passed over the mixture, varying amounts of water are evaporated.

If different size lead oxides from two different manufacturers are used in two different batches, both batches could have vastly different process water requirements. When a mixture of the two different size lead oxides is supplied to the same mixer, the process water requirements can vary during the transition from one oxide to the other. To further complicate the problem, some lead oxides from the same supplier vary from one extreme to another.

Therefore, adding the problem of the ambient temperature changes to the multiplicity of complications associated with the use of lead oxide, can result in the necessity of adding unwanted and unduly large quantities of trim water to the final product. Major water additions to the battery paste after the completion of the chemical reaction adversely affect the chemical quality of the finished product, which is costly to manufacture. The unwanted addition of trim water to the final product by either manual or automatic techniques causes a loss in time of both the process cycle time and the operator's time, thereby decreasing production capacity accordingly.

SUMMARY OF THE INVENTION

Therefore, the principal object of the present invention is to provide a new and improved method and apparatus for making lead oxide battery paste with little or no need for adding trim water to the final product, despite ambient temperature changes and variations in lead oxide granular sizes.

Briefly, the above and further objects are realized in accordance with the present invention by providing a method of making battery paste by mixing selected quantities of lead oxide and water to form a mixture, the viscosity of which ascends on a time-viscosity curve. A selected quantity of sulfuric acid is then admixed to form a reaction mixture, the viscosity of which initially descends on the time-viscosity curve until it changes slope to reach a point of minimum viscosity. The temperatures of the reaction mixture form a time-temperature curve having a peak temperature therein at a time subsequent to the acid addition. Both the temperature and the viscosity are sensed, and a quantity of water is added to the reaction mixture when the temperature rises to a predetermined temperature or above and the viscosity thereof increases to a value at or above a predetermined value. The predetermined temperature corresponds approximately to at least one of (a) a temperature at which a predetermined time-viscosity curve reaches a point adjacent to the minimum viscosity, and (b) a temperature on a predetermined time-temperature curve which corresponds to said predetermined time-viscosity curve, at a point adjacent to and below its peak. As a result, the water content of the reaction mixture is adjusted so as to approximate the water content desired in the final product.

Furthermore, the above and further objects are realized in accordance with the present invention by providing control apparatus which includes temperature sensing devices for determining the temperature of the battery paste mixture and viscosity sensing devices for determining the viscosity of the mixture. Valve devices are controlled by coincidence devices to admit water to the mixture. The coincidence devices activate the valve devices to admit water when the temperature sensing devices determine the temperature of the mixture to be a minimum temperature or above, and the viscosity sensing devices determine the viscosity of the mixture to be at or above a maximum acceptable value of viscosity. The coincidence devices cause the activation of the valve means for admitting water to the mixture until the viscosity is reduced to a value below the maximum acceptable value to cause the viscosity sensing devices to de-energize the coincidence devices and thus to deactivate the valve devices. In one form of the invention, a timer responds to the temperature sensing devices determining the temperature of the mixture to be a minimum temperature or above for disabling the coincidence devices after a predetermined time interval.

The provision of the new battery making method and control apparatus enables the water content to be adjusted during the chemical reaction so as to approximate the residual water desired in the final product and thus to approximate the viscosity desired in the final product, despite ambient temperature changes and variations in lead oxide granular sizes, and thereby eliminates or greatly reduces the necessity of adding trim water at the conclusion of the process. Thus, by employing the method and apparatus of the invention, there is no need to cause an adverse effect on the chemical properties of the final product by requiring the addition of overly large quantities of trim water to adjust the physical property of viscosity.

By eliminating or at least greatly reducing the need for extending the process cycle time to include the final trim water addition operation, there is also realized a great cost savings by reducing proportionately the length of time required for making a batch of battery paste and by reducing proportionately the labor needed to attend to the final trim water addition.

Additional benefits flow from the use of the new method and apparatus in that runaway temperature conditions of the mixture are prevented or at least greatly inhibited, since water is added during the process when the temperature of the mixture exceeds certain maximum temperatures, and thus vaporization occurs to increase the viscosity above the maximum acceptable value. In this regard, the uncontrolled building up of temperatures of the mixture can damage an expensive batch of battery paste. Such a runaway condition can occur as a result of a rapid buildup of heat produced chemically due to the reaction of the materials if the circulation of cooling water or cooling air should cease to function properly, as well as heat produced by friction caused when the materials are mixed together and the mixture becomes very viscous and stiff in consistency.

Other benefits resulting from the use of the new method and control apparatus relate to the ability to control the temperature and the viscosity of the reaction mixture during the process by admitting selectively water thereto. Thus, the new method and control apparatus also serves as an aid to the battery making process itself for helping achieve desired end results.

These and other objects and advantages of the invention will be apparent upon consideration of the following detailed description.

DESCRIPTION OF THE DRAWINGS

In the accompanying drawings forming a part of the specification, one exemplary embodiment of the invention which is designed primarily, but not necessarily, for the mixing of dry lead oxide with sulfuric acid and water is shown.

In these drawings:

FIG. 3 is a schematic circuit diagram of the control circuit of the equipment of FIG. 1; and FIG. 4 is a wave form diagram of the recycle timer of the circuit of FIG. 3.

DESCRIPTION OF THE PREFERRED EMBODIMENT

Figure 1:
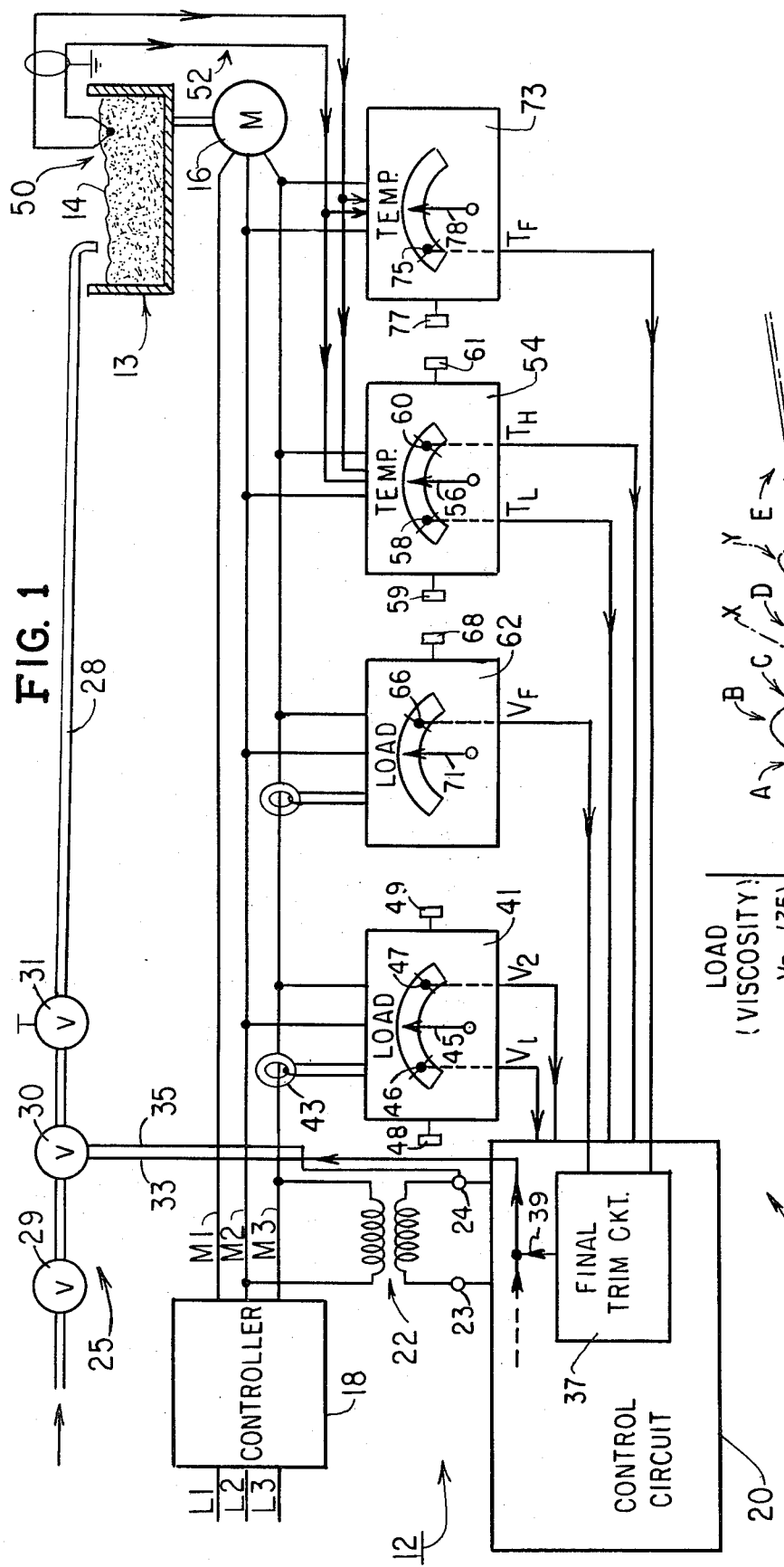
FIG. 1 is a diagrammatic view of a battery paste making equipment, which is constructed in accordance with the principles of the present invention.
Figure 2:
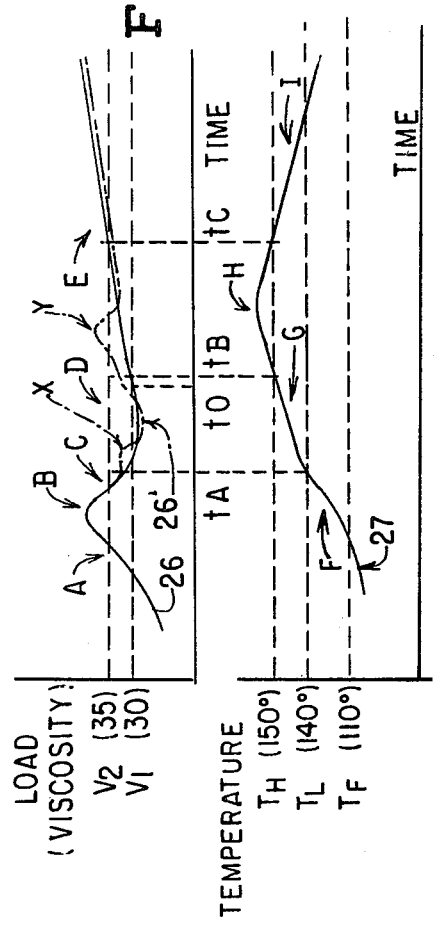
FIG. 2 is a composite graph of load and temperature curves which represent a process of making an ideal batch of battery paste, and which illustrate the alteration of the curves in accordance with the method of the present invention.

Referring now to the drawings and more particularly to FIGS. 1 and 2 thereof, there is shown battery paste making equipment 12, which is constructed in accordance with the present invention and which is used in connection with the mixing of lead oxide, water and sulfuric acid, together with other possible additives, in the production of battery paste used in the manufacture of automobile and other wet cell batteries. While the invention will be described with relation to such use, it is to be distinctly understood that other uses for the invention are contemplated, as will become apparent to those skilled in the art.

As shown in FIG. 1 of the drawings, equipment 12 generally comprises a power mixer 13 which is used to disperse the materials being introduced automatically therein by apparatus (not shown), and the temperature of the mixture is controlled by apparatus (not shown) for producing a battery paste mixture 14. The battery paste making process is an automatic batch-type operation in that one batch at a time is prepared. For a more complete disclosure of a suitable mixer and its associated controls for material introduction, reference may be made to U.S. Pat. Nos. 3,980,282 and 4,071,168.

An electric motor 16 powers the mixer 13 to cause the materials to be dispersed therewithin in accordance with techniques, such as disclosed more fully in the U.S. Pat. Nos. 3,980,282 and 4,071,168. Three-phase lines L1, L2 and L3 apply power through a controller 18 via the three-phase conductors M1, M2 and M3 to energize the motor 16. Control apparatus generally indicated at 19 includes a control circuit 20, which monitors the battery paste making process and causes the making of adjustments to the process during the making of a batch of battery paste 14, as hereinafter described in greater detail, the circuit 20 being powered by 120 volts A.C. derived from the power conductors M2 and M3 via a control transformer 22 to a pair of input terminals 23 and 24, respectively. A trim water supply generally indicated at 25 is actuated by the control circuit 20 to cause water to be added to the mixture 14 in the mixer 13 as hereinafter described in greater detail.

Considering now the battery paste making process in accordance with the method of the present invention, with particular reference to FIG. 2 of the drawings, an upper curve 26 shown in solid lines is a time-load curve illustrating for a single batch of lead oxide battery paste the variation in the loading of the motor 16 with respect to time. The motor loading is directly proportional to the viscosity of the mixture 14, and thus the curve 26 is also a time-viscosity curve. For sake of explanation, henceforth the curve 26 will be referred to as a time-viscosity curve. The curve 26 is an exemplary curve, determined empirically by trial and error for one particular formulation of battery paste resulting in a final product having desired water content and viscosity. It should be understood that the exemplary curve 26 is a representative example only, and there may be for any one battery paste formulation, more than one such exemplary curve. Also, such exemplary curves ordinarily vary in actual practice for each different type and kind of battery paste formulation.

In FIG. 2, a lower solid line curve 27 is a time-temperature curve illustrating the variation of the temperature of the mixture 14. The curve 27 is also an exemplary curve, which is determined empirically by trial and error, as hereinafter described in greater detail, corresponding to the curve 26 for the particular formulation of battery paste. The curve 27 is also one of possibly several such exemplary curves for a particular formulation, and it should be understood that such exemplary temperature curves also vary according to the type and kind of battery paste formulation.

Considering now the upper viscosity curve 26 in greater detail with reference to FIG. 2 of the drawings, at the beginning of the initial portion on the viscosity curve 26, a selected quantity of water is admitted to the mixer 13 including sometimes the introduction of additives to the mixer 13 to form a slurry therein. Thereafter, a selected quantity of lead oxide and some additional water are introduced to the mixer 13 to be dispersed within the slurry to form a paste during the curve portion A. Upon combining these materials, the resulting mixture becomes progressively more viscous (an increasing load on the motor 16 is experienced), and thus the viscosity of the mixture ascends on the time-viscosity curve 26, until the viscosity reaches a peak portion B.

After the lead oxide and water mixture is thoroughly dispersed at the peak portion B, a selected quantity of sulfuric acid is mixed with the lead oxide and water to form a reaction mixture, at which point the curve 26 experiences a reversal at the peak portion B. The acid dilutes and lubricates the mixture in the mixer 13, thereby reducing the viscosity of the reaction mixture from the peak portion B along a descending portion C of the viscosity curve 26 (a decreasing load on the motor 16 is experienced). The curve 26 changes in slope at a time $t_A$ and undergoes a reversal at a knee or plateau portion D of the curve 26, to define a point of minimum viscosity. At the beginning of the knee portion D at the time $t_A$, the chemical reaction is continuing to take place. Along the knee portion D between time $t_A$ and $t_O$, the acid has become sufficiently dispersed in the reaction mixture and has increasingly begun to react with the other materials to cause more heat of reaction to develop. As a result, the mixture starts to become gradually more stiff in consistency due to some of the water having vaporized from the heat and due to the properties of the hot lead oxide. Thus, at a gradually ascending portion E of the curve 26, the viscosity of the mixture 14 increases gradually until the reaction is completed at the end of the process.

As shown in the lower solid line temperature curve 27, during the addition of the lead oxide and water corresponding to the ascending portion A of the viscosity curve 26, the temperature of the mixture increases initially along a portion F of the curve 27 as a result of friction and some chemical reaction taking place between the air, the water and free lead contained in the lead oxide. The temperature continues to rise along the temperature curve portion F corresponding to the peak portion B of the viscosity curve 26 when the acid addition occurs, since reaction and frictional heating continues to take place.

At the time $t_A$ corresponding to the beginning of the knee portion D of the viscosity curve 26 when increased reaction occurs, the slope of the temperature curve 27 changes and continues to increase at a slower rate along a curve portion G until a flattened peak or plateau portion H is reached between time $t_B$ and time $t_C$ at a temperature of 150° F. in this example. The temperature of the reaction mixture descends gradually from the time $t_C$ along the curve portion I, until the final discharge temperature is reached.

Considering now the process for deriving the exemplary curves 26 and 27, with particular reference to FIG. 2 of the drawings, an initial batch of battery paste is made following a known battery paste making formula. During the making of the initial batch, viscosities and temperatures of the mixture are recorded, preferably by a chart recorder (not shown) to provide initial time-viscosity and time-temperature curves (not shown) similar to the respective solid line curves 26 and 27. Penetrometer and sometimes laboratory tests are performed on the final product, and the viscosity and temperature values are observed from the initial curves including the discharge values to determine whether or not the values are within satisfactory tolerances dictated by the formula. If not, human judgment is used to make adjustments in the process in an attempt to compensate for the deficiencies.

Thereafter, another batch is made, and the temperatures and viscosities are recorded. This procedure is repeated until a final product having desired chemical properties and a desired discharge viscosity is achieved by trial and error. The solid line curves 26 and 27 represent such exemplary curves.

The exemplary curves 26 and 27 are then used to determine by observation certain values of viscosity and temperature for use in the method and apparatus of the present invention. Using the viscosity curve 26, the viscosity value $V_1$ is selected to be a relative value 30 and viscosity value $V_2$ is selected to be relative value 35, and a time-out interval $t_A$ to $t_O$ is also chosen from the upper viscosity graph of FIG. 2. As shown on the lower temperature graph of FIG. 2, the temperature values $T_L$ and $T_H$ are selected to be 140° F. and 150° F., respectively. Since an acceptable range of final product viscosities are permitted ordinarily, some variation in the selection of the predetermined temperatures is possible.

The low temperature $T_L$ is the temperature selected a time $t_A$ when the viscosity curve 26 becomes relatively flat, at the beginning of the knee portion D. The temperature $T_L$ may also be selected at a time subsequent to the time $t_A$ corresponding to a point on the viscosity curve at or near the minimum viscosity. The high temperature $T_H$ is chosen at a temperature equal to the peak temperature (155° F.) less 5° F. The temperature $T_H$ may also be chosen at a slightly higher or lower temperature as some variation is possible.

The first viscosity value $V_1$ is selected at a point slightly above the minimum value of viscosity at the knee portion D of the curve 26. The value $V_1$ may also be selected at the other points, such as precisely at the minimum viscosity, since the goal is to reduce the viscosity of subsequent production batches to a value below the predetermined viscosity value selected from the exemplary viscosity curve at the knee portion thereof to adjust thereby the final product water content and viscosity. The time-out value $t_O$ is also selected by observing the appropriate length of time $t_A$ to $t_O$ when the knee portion D remains approximately flat, but somewhat longer or shorter intervals may also be acceptable. The second viscosity value $V_2$ is selected from the curve 26 by observing the value of viscosity at the time $t_C$ at the end of the temperature peak portion H of the curve 27.

Thus, predetermined temperature $T_L$ is a temperature at which the predetermined exemplary time-viscosity curve 26 reaches a point adjacent to the minimum viscosity. The predetermined high temperature $T_H$ is a temperature at a point on the predetermined exemplary time-temperature curve 26, a point adjacent to and below the peak temperature at the peak portion H.

Using these predetermined values, water can be added, as needed, to the reaction mixture of subsequent batches prior to the completion of the final product to compensate for unwanted water loss and thus to approximate the water content desired in the final product to provide an acceptable viscosity thereof. In accordance with the method of the present invention, if required, the desired corrections are made at a time corresponding to the viscosity knee portion D of the viscosity curve 26 and at a time corresponding to the temperature peak portion H of the temperature curve 27 to cause the time-viscosity curve of a given batch to more closely approximate the shape of the exemplary curve 26 at those two intervals of time to achieve a desired final water content, a final viscosity, and, in general, a final product which possesses enhanced physical as well as chemical properties. In practice, once the exemplary curves 26 and 27 are obtained and the values are selected therefrom, the quantity of the water added at the beginning of the batch is adjusted downwardly to cause deliberately the final product to be within acceptable limits, relatively more dry and viscous, since it is not desirable and is very difficult and time consuming to remove water from the final product. In this manner, during the making of a production batch, usually water addition is called for in accordance with the method and apparatus of the present invention.

As shown in phantom lines in FIG. 2, the phantom line time-viscosity curve 26' is a viscosity curve portion occurring after time $t_A$ of a production run battery paste batch which is starting to become too dry and thus too viscous as compared to the exemplary curve 26 in the area of the knee portion D immediately following time $t_A$. According to the invention, water is added automatically to the reaction mixture in response to the control apparatus 19 (FIG. 1) when the viscosity of the dry reaction mixture rises to a value at or above the predetermined first maximum acceptable value of viscosity $V_1$ and when the temperature of the dry reaction mixture is at or above the predetermined low minimum temperature $T_L$. When the time viscosity curve 26' reaches a point above the predetermined maximum acceptable viscosity $V_1$ at a temperature, which is above the minimum temperature $T_L$, water is called for by the control apparatus 19. After a predetermined delay time, water is admitted to the mixture and starts to take effect on the viscosity thereof at a point X on the curve 26'. Water continues to be admitted to the mixture until its viscosity decreases below the predetermined viscosity $V_1$. At the time $t_O$, the water is shut off to avoid overly compensating the mixture by adding too much water, since thereafter the curve 26 normally rises to a higher viscosity.

In the region of the temperature peak of the exemplary temperature curve 27 between times $t_B$ and $t_C$, it is assumed that the curve 26' indicates the viscosity of the mixture is becoming too viscous relative to the exemplary curve second predetermined value $V_2$. According to the invention, water is again called for by the control apparatus 19 when the temperature is at or above the predetermined high minimum temperature $T_H$ and the viscosity is at or above the predetermined second maximum acceptable viscosity $V_2$. Water is delivered to the mixture after a predetermined delay time and the water starts to take effect on the mixture at a point Y on the curve 26'. Water continues to be admitted to the mixture, until the viscosity decreases below the value $V_2$.

It should be noted that there is no time-out interval associated with this latter situation occurring at the temperature peak H, because if the additional trim water does not succeed in reducing the viscosity below the value $V_2$, a potentially damaging runaway situation has occurred inadvertently. Therefore, in such a situation, it is desirable to continue to add water to the mixture, and an alarm is sounded for the attendant as hereinafter described in greater detail.

It should be understood that different exemplary curves may have a temperature peak portion which overlaps in time with the viscosity knee portion without interfering with the proper operation of the method and apparatus of the present invention, since both occurrences independently call for the activation of the same water supply 25 at the same time. Also, it should be noted that the conditions $V_1$, $V_2$, $T_L$ and $T_H$ are usually different for each formulation, and that $V_1$ may be a larger number than $V_2$ for some applications.

It should be understood that water can be added to the mixture at either the knee portion D or at the peak portion H, or both. While it is preferred to employ a correction at both the knee portion D and the peak portion H, a correction could be made at the knee portion D only, or alternatively, at the peak portion H only. Where only one correction point is employed, it is preferable to achieve the correction at the point as near to the end of the reaction cycle as possible.

Should the end product for any reason be more viscous than a predetermined final viscosity value $V_F$ (not shown), which in the present example is a relative number above $V_2$, a final trim of water may be added to the mixture when the temperature falls below a predetermined final temperature $T_F$ (110° F. in this example), as hereinafter described in greater detail and as described more fully in U.S. Pat. No. 4,027,859. However, it is to be clearly understood that the method and apparatus of the present invention ordinarily eliminate the need for any final trim operations.

Considering now the equipment 12 in greater detail with particular reference to FIG. 1 of the drawings, the trim water supply 25 delivers water to a long pipe 28 inclined downwardly toward the mixer 13 to supply trim water to the mixture for dispersion therein under the control of the circuit 20 from a source of water under pressure through a pressure reducing valve 29 set below the pressure of the source (not shown), a normally-closed, two-way, two-position, single solenoid, spring return valve 30, and an adjustable flow control valve 31 to the pipe 28. With the water source at a higher pressure than the pressure reducing valve setting, the water is maintained at a constant pressure despite fluctuations in the pressure of the water source as long as the lowest pressure is still above the setting of the pressure reducing valve. Thus, the flow control valve need not be pressure compensated. By throttling down the flow control valve, the flow is less and therefore can be more precisely measured by time. Water flows into the mixer 13 only so long as the solenoid valve 30 is open. It should be noted that the pipe 28 is designed to be a sufficiently long predetermined length so that the trim water flows through a substantial predetermined distance in the pipe 28 before entering the mixer 13 and dispersing with the mixture therewithin. In this manner, the quantity of trim water is metered out over a predetermined time delay (such as 2 seconds) as it enters the mixture rather than dumping the quantity of water abruptly into the mixture and thus causing an unwanted sudden change in viscosity, thereby falsely indicating that the viscosity has decreased below the maximum acceptable value. Instead, the pipe 28 enables the valve 30 to remain activated for the predetermined time delay interval independently of the viscosity condition of the mixture when the valve 30 is activated initially.

A pair of leads 33 and 35 supply power to energize the solenoid valve 30, as hereinafter described in greater detail, for supplying trim water to the mixture 14 in the mixer 13, the lead 33 being energized by the control circuit 20 when trim water is required at the viscosity knee and at the temperature peak as hereinbefore described, the lead 35 being connected to the terminal 24. The lead 33 is also energized by a final trim circuit 37 shown as a part of the control circuit 20 to supply trim water to the mixture 14 at the conclusion of the process via a lead 39, should any additional trim waater be required at the conclusion of the process. The final trim circuit 37 is disclosed in detail in U.S. Pat. No. 4,027,859. The circuit 37 supplies a signal via the lead 39 to the control lead 33 for the solenoid valve 30 when the temperature of the mixture has fallen below the temperature $T_F$ at the completion of the battery paste making process.

In actual operation of the trim water supply 25, a series of pulse signals are supplied to the lead 33, whereby each pulse turns on the valve 30 to supply water to the mixture followed by an off cycle permitting a dispersion time for distributing the water throughout the mixture in the mixer 13 as hereinafter described in greater detail. Once the viscosity of the mixture is sufficiently reduced, the valve 30 is permitted to return to and remain at its closed position.

Relative viscosity values of the mixture 14 are determined by a dynamometer type instrument referred to hereinafter as a load meter 41. It monitors continuously the power being drawn by the motor 16, since the power being drawn by the motor 16 is proportional directly to the viscosity of the mixture 14. For this purpose, a current coil 43 surrounding the power conductor M3 is connected to the current input for the load meter 41, the potential input for the load meter 41 being connected through a suitable transformer (not shown) to the conductors M2 and M3. The load meter 41 includes an indicator 45 which, when it moves pivotally in a clockwise direction firstly into engagement with a low set point 46 and therepast, generates a first viscosity indicating signal supplied to the control circuit 20. When the indicator continues to move into engagement with and past a high set point 47, a second viscosity indicating signal is generated by the meter 41 and supplied to the control circuit 20. Manually adjustable knobs 48 and 49 adjust the positions of the respective set points 46 and 47. Thus, the set points 46 and 47 are set at the predetermined relative values $V_1$ and $V_2$, respectively.

In order to monitor the temperature of the mixture in the mixer 13, a thermocouple 50 is connected via suitably shielded leads 52 to a set point temperature meter 54, which is similar to the load meter 41, and which has an indicator 56 for closing a low temperature set point 58 as the indicator moves in a clockwise direction therepast to generate a low temperature indicating signal for supplying it to the control circuit 20, a manual knob 59 being adapted to positionally adjust the set point 58 at the predetermined relative low temperature value $T_L$. Similarly, a high temperature set point 60, when closed by the indicator 56 moving rightwardly therepast, causes the generation of a high temperature indicating signal for the control circuit 20, a manual knob 61 enabling the set point 60 to be adjusted positionally at the predetermined relative high temperature value $T_H$. It should be understood that while analog-type meters are disclosed herein, it will become apparent to those skilled in the art that digital electronic coincidence meters may also be used.

Generally speaking, the final trim circuit 37 for providing the addition of trim water at the conclusion of the process is for back-up purposes only, since the control circuit 20 adds trim water to the mixture during the process prior to its conclusion to obviate the need for any additional water after the process is completed. Thus, the control circuit 20 determines in each case when and if water should be added during the process to prevent the resulting battery paste from becoming too dry, and therefore the formula is compensated for by the addition of water at predetermined times during the reaction time of the process of making battery paste.

As described in greater detail in U.S. Pat. No. 4,027,859, in order to sense the viscosity for the final end product so that additional water may be added, if needed, to adjust the consistency of the final product, a load meter 62 is provided and is similar to the load meter 41 and is connected similarly to monitor the viscosity of the mixture in the mixer 13. The load meter 62 will hereinafter be referred to as the final viscosity meter 62. the meter 62 includes a set point 66, which is positionally controlled by a knob 68 to be set at the predetermined final viscosity $V_F$ and which, when closed, generates a final viscosity meter signal for supplying it to the final trim circuit 37. An indicator 71 responds to the loading conditions of the motor 16 and engages the set point 66 as it moves rightwardly therepast.

A temperature meter 73 is provided for monitoring the final temperature of the end product and is similar to the temperature meter 54. The temperature meter 73 has a set point 75 which is positionally adjusted by means of the manually operable knob 77 at the predetermined final temperature $T_F$ and which is closed by means of the indicator 78 moving leftwardly therepast to generate a final temperature indicating signal for supplying it to the final trim circuit 37. As a result, should the viscosity of the final product exceed the set point value determined by the set point 66 and the temperature of the final product is below the final predetermined temperature $T_F$ of 110° F., signals are supplied from the meters 62 and 73 to the final trim circuit 37 to cause trim water to be added to the mixture 14 until the viscosity thereof falls below the predetermined value $V_F$.

Considering now the control circuit 20 in greater detail, with particular reference to FIGS. 3 and 4 of the drawings, in order to add trim water to the mixture 14 at the knee portion D (FIG. 2) of the viscosity curve 26, a first coincidence circuit 80 causes the energization of the solenoid valve 30 as hereinafter described in greater detail. The first coincidence circuit 80 generally comprises a series circuit of a normally-open switch 81 which is closed in response to the low temperature indicating signal from the actuation of the set point 58 of the meter 54 and a normally-open switch 83 which is closed in response to the viscosity indicating signal from the activation of the set point 46 of the meter 41.

In order to add the trim water at the temperature peak indicated at H in FIG. 2 of the drawings, a second coincidence circuit 84 is also adapted to energize the solenoid valve 30. The second coincidence circuit 84 generally comprises a series circuit of a normally-open switch 85 which is closed by the high temperature indicating signal in response to the activation of the set point 60 and a normally-open switch 87 which is closed in response to the activation of the set point 47.

It should be understood that the four switches 81, 83, 85 and 87 symbolically represent relay contacts of relay coils (not shown) serving as interface relays for the corresponding set points on the viscosity meter 41 and the temperature meter 54. Thus, the first coincidence circuit 80 responds to the low temperature signal and to the first viscosity signal for actuating the solenoid valve 30 to add a predetermined quantity of water to be dispersed into the mixture to render it less viscous at the knee portion D (FIG. 2) of the curve 26. The second coincidence circuit 84 responds to the high temperature indicating signal and to the second viscosity signal for actuating the solenoid valve 30 to add a predetermined quantity of water to be dispersed into the mixture 14 (FIG. 1) to render it less viscous at the temperature peak portion H (FIG. 2) of the temperature curve.

A timer 89 starts timing at the time $t_A$ (FIG. 2) when the switch 81 is closed and times out at the end of its timing interval at the time $t_O$ to disable the coincidence circuit 80 to limit the amount of water being added to the mixture as hereinafter described in greater detail. The timer 89 is adjustable as to the length of its timing interval, but in the present example, the time-out interval is set for two minutes so that in response to the low temperature signal causing the closure of the switch 81, when the timer 89 times out after two minutes, the actuation of the solenoid valve 30 is interrupted as hereinafter described in greater detail.

A recycle timer 90 provides a square wave pulse train as shown in FIG. 4 of the drawings to turn the valve 30 on and off repeatedly to cause the trim water supply 25 to deliver a series of predetermined quantities of water to the mixture 14. The timer 90 is adjustable both for its OFF time interval and its ON time interval so as to provide an adjustable control for the valve 30 and thus to control adjustably the trim water supplied to the mixture. As shown in FIG. 4 of the drawings, when either one or both of the coincidence circuits 80 and 84 energize the solenoid valve 30, the timer 90 initially delays coming on for eight seconds followed immediately by a five second ON time to provide a five second quantity of water to the mixture 14. Following the ON time, an eight second dispersion time is provided, whereby the valve 30 is closed to enable the water to be dispersed within the mixture 14. The ON and OFF times may vary depending upon the requirements for the particular process. Thereafter, if additional water is called for, a second five second pulse is produced by the timer 90 to again turn on the valve 30 to supply a second measured quantity of water to the mixture 14, whereby the solenoid valve 30 is pulsed repeatedly until the viscosity of the mixture falls below the predetermined viscosity value.

An over-trim timer 92 counts the number of times the solenoid valve 30 is turned ON, and therefore, counts the number of bursts of water added to the mixture 14, for the purpose of safeguarding against the addition of too great a quantity of water to the mixture 14. If the number of bursts or squirts of water added to the mixture 14 exceeds a predetermined number, the timer 92 causes an alarm signal to be generated by providing an audible signal from a horn 94 as well as a visual signal from a lamp 96.

The control circuit 20 operates in an automatic mode by closing a pair of manual switches 98 and 100 as hereinafter described in greater detail. The circuit 20 also can function in a manual mode of operation by closing a normally-open manual switch 102, which is spring-biased into its open position for the purpose of adding additional trim water where such water is needed, such as in the case of a runaway temperature condition, as hereinafter described in greater detail.

Considering now the control circuit 20 in greater detail, a normally-open switch 104 is connected in series between the terminal 23 and the automatic switch 98 and is a contact switch of a relay (not shown), which is energized automatically following the acid solution at the peak B (FIG. 2) of the viscosity curve so that the control circuit 20 becomes operative at that portion of the viscosity curve by the circuits (not shown) controlling acid addition.

The switch 81 is connected between the manual switch 98 and a point 106, and the first and second coincidence circuits 80 and 84 are connected in parallel between the point 106 and the automatic switch 100 so that either one or both of the coincidence circuits, when operated, extend the potential from the terminal 23 toward the solenoid valve 30 as hereinafter described in greater detail. The switches 85 and 87 of the coincidence circuit 84 are connected in series, and the series connected switches are in turn connected in parallel across a series combination of the timer 89 and switch 83.

The timer 89 is an on delay timer, which has its clutch coil 108 connected between the terminals 1 and 2 connected between the point 106 and the terminal 24 for the circuit 20, so that once the switches 104 and 81 are closed and the circuit 20 is operating in its automatic mode of operation, the clutch coil 108 connects the cams (not shown) of the timer 89 to the synchronous timing motor 111 of the timer 89. A pair of normally-closed contacts 113 of the timer 89 between the terminals 11 and 6 of the timer 89 connect the synchronous motor 11 across the clutch coil 108 so that the motor 111 is also energized when the clutch coil 108 becomes energized. Thus, at the beginning of the viscosity knee, should the low temperature signal cause the switch 81 to become closed when the circuit 20 is operating in its automatic mode of operation, the motor 111 is energized to commence the time-out interval. At the end of the two minute time-out interval at the time $T_O$ (FIG. 2), a normally-closed switch 115 connected between the terminals 9 and 10 of the timer 89 is moved to its open position slightly before the switch 113 is opened as a result of the camming operation controlled by the motor 111. The switch 115 is connected between the point 106 and the first viscosity switch 83 so that the switch 115, when opened, overrides the trimming operation at the end of the viscosity knee D. By opening the switch 113, the motor 111 becomes deenergized. The timer 89 is re-set once the power is removed from the clutch coil 108 when one of the switches 81, 98 or 104 opens at or before the end of the cycle.

The automatic mode switch 100 is connected between the coincidence circuits 80 and 84 and a point 116, the recycle timer 90 being connected between the point 116 and the terminal 24. As a result, when the switch 100 is closed for an automatic mode of operation, the timer 90 is turned on once one of the coincidence circuits 80 and 84 calls for a water trimming operation and the switches 81, 98 and 104 are closed. A normally-open switch 117 controlled by the timer 90 is pulsed once the timer 90 is energized in accordance with the pulse diagram as shown in FIG. 4 of the drawings. The switch 117 is connected between the point 116 through the over-trim timer 92 to the solenoid valve 30. Once the timer 90 is energized, the switch 117 remains open for eight seconds as shown in FIG. 4 of the drawings to eliminate any false triggering of the solenoid valve 30. It should be noted at the five second interval of time when the solenoid valve 30 is energized, the trim water supply 25 is operative, and therefore, the on portion of the wave form shown in FIG. 4 determines the length of time that water is delivered to the mixture.

Considering now the over-trim timer 92 in greater detail, the timer 92 is also an on delay timer and has a clutch coil 120 connected between the terminals 1 and 2 of the timer, the terminal 1 being connected to the point 106 and the terminal 2 being connected to the terminal 24 so that when the switches 81, 98 and 104 are closed, the clutch coil 120 causes the timer cams (not shown) to be operatively associated with the synchronous motor 122 of the timer 92. It should be noted that timers 89 and 92 are similar and their applicable terminals are numbered correspondingly.

A single pole, double throw switch 124 of the timer 92 normally connects the synchronous motor 122 from the terminal 24 to the terminal 6 of the timer through the switch 124 to the terminal 11 of the timer, and from the terminal 11 through a jumper lead 126 to a point 128 between the switch 117 and the terminal 9 of the timer 92. As a result, when the switch 124 is disposed in the position as illustrated in FIG. 3 of the drawings, the synchronous motor 122 is energized each time the switch 117 of the recycle timer 90 is closed, and therefore, the synchronous motor 122 is advanced for five seconds each time the solenoid valve 30 is closed and the trim water supply 25 is energized. As a result, the clutch coil 120 is activated once the switches 81, 98 and 104 are all closed to prepare the timer 92 for operation by operatively associating the cams to the motor 122, whereby each time the solenoid valve 30 is energized, the synchronous motor 122 is advanced by five seconds corresponding to the on time of the recycle timer 90. Thus, the over-trim timer 92 can be set for a predetermined number of pulses of the recycle timer corresponding to the number of bursts of water delivered to the mixture in the mixer 13. Once that predetermined number, such as the number 12 in the present example, has been counted by the timer 92, the switch 124 moves to its other position for connecting the point 128 to the terminal 7 of the switch 124 and from there to the parallel connected alarm devices in the form of the horn 94 and the lamp 96 for generating attention-attracting signals for the operating personnel to determine the cause of the over-trimming problem. It should be noted that when such a situation occurs, the recycle timer 90 continues to pulse its switch 117 to supply electrical energy through the switch 124 to the horn 94 for causing it to produce an intermittent audible signal and to energize the lamp 96 to provide a flashing visual indication. A normally-closed switch 131 is connected between the timer terminals 9 and 10 and is connected from the point 128 to the lead 33 extending to the solenoid valve 30 for extending the pulsing signal from the switch 117 to the solenoid valve 30. When the timer 92 reaches its maximum count, the switch 124 moves to its other position and the switch 131 opens so that the pulsating power supplied by the switch 117 is extended to the alarm devices and power is interrupted to the solenoid valve 30, which then remains closed to prevent any further water entering the mixture 12. It should be noted that in order to set the timer 92 for a predetermined number of 12 counts of the pulses generated by the timer 90 for activating the solenoid valve 30, the timer 92 would be pre-set at sixty seconds, since each one of the pulses produced by the timer 90 is five seconds in duration. As a result, when 12 five second pulses are delivered to the timer 92, the motor 122 will have been driven by a total of sixty seconds before timing out to cause the switches 124 and 131 to be moved for the purpose of de-activating the solenoid valve 30 and energizing the alarm devices 94 and 96.

In order to deenergize the horn 94 and the lamp 96, the automatic switches 98 and 100 are opened to, in effect, turn off the control circuit 20, and then the switches 98 and 100 are immediately moved manually to their closed position as shown in FIG. 3 of the drawings. By doing this, when the switches 98 and 100 are moved to their open position, power is removed from the timer 92 to cause it to re-set to its starting position, and then when the switches 98 and 100 are returned to their closed positions, the power does not extend to the horn 94 and the lamp 96, since the switch 124 of the timer 92 has returned to its initial position as shown in FIG. 3 of the drawings. Thus, the circuit 20 is then ready for another cycle of operation, if desired.

Should a temperature runaway situation occur where the temperature of the mixture 14 rises uncontrollably, the water supply 25 would operate to supply 12 pulses, at which time the timer 92 would time out to prevent additional water to be supplied to the mixer 13 and the horn 94 and the lamp 96 would cause the attendant to first of all deenergize the alarm devices and then operate the circuit 20 manually. When the manual switch 102 is closed and is held closed by the attendant, power is connected directly from the terminal 23 through the closed switch 102 to the point 116 for calling for the solenoid valve 30 to be energized by activating the recycle timer 90 to start pulsing the solenoid valve 30 after the initial off delay interval of eight seconds as shown in FIG. 4 of the drawings. Thus, by closing the manual switch 102, the coincidence circuits 80 and 84 are overridden and directly call for trimming water to be supplied to the mixer 13 for so long as the switch 102 is closed. It should be understood that while three manual switches 98, 101 and 102 are shown in the drawings, it will become apparent to those skilled in the art that a single selector switch can be employed having three separate positions; namely, Manual, Automatic and Off. In this regard, when the manual operation is employed, the automatic switches 98 and 100 are opened to their off positions so that the manual switch 103 provides the necessary control of the circuit 20.

The manual switch 102 also may be used during the calibration of the equipment 12 for a particular formulation of the battery paste in determining the amount of water to be delivered by the water supply 25 during each burst or squirt delivered to the mixer 13. In general, the manual mode of operation enables the coincidence circuits to be overridden and to enable water to be added to the mixer 13, when desired.

Referring now to FIG. 2 of the drawings, it should be noted that in the viscosity curve, the portion E following the viscosity knee D may be a very low flat curve portion, and therefore the time-out interval from time $t_A$ to the time $t_O$ can be extended from two minutes to a much greater length of time since the first viscosity value $V_1$ may be applicable for a greater length of time and the second viscosity number or value $V_2$ may never be exceeded at the temperature peak between the time $t_B$ and the time $t_C$.

The invention is not to be limited to the exact arrangement of parts shown in the accompanying drawings or described in this specification as various changes in the details of construction may be resorted to without departing from the spirit or scope of the invention. For example, although an electric motor is shown herein as constituting the driving means for the mixer 13, other forms of electrically controlled motor devices may be employed, as for example, an hydraulic or pneumatic motor. In such an instance, the load meter (dynamometer) which is used to measure the power required to drive the motor will be in the form of an hydraulic or pneumatic dynamometer having connections to the motor which reflect both the back-up pressure at the motor and the fluid flow through the motor. While electro-mechanical control devices have been disclosed herein, electronic control circuits may also be employed. Therefore, only insofar as the invention is particularly pointed out in the accompanying claims is the same to be limited.

I claim:

1. In battery paste making equipment for mixing selected quantities of lead oxide, sulfuric acid and water to form a viscous mixture, control apparatus comprising:
   temperature sensing means for determining the temperature of the mixture;
   viscosity sensing means for determining the viscosity of the mixture;
   valve means for admitting water to the mixture;
   coincidence means responsive to said temperature sensing means determining the temperature of the mixture to be a minimum temperature or above and to said viscosity sensing means determining the viscosity of the mixture to be at or above a maximum acceptable value of viscosity, for activating said valve means to admit water to the mixture until the viscosity thereof is reduced to a value below the maximum acceptable value, whereupon said viscosity sensing means disables said coincidence means, thereby de-activating said valve means.

2. Battery paste making equipment according to claim 1 further including timing means responsive to said temperature sensing means at a minimum temperature or above, for disabling said coincidence means after a predetermined time interval.

3. Battery paste making equipment according to claim 2 wherein said minimum temperature is a minimum low temperature and said maximum acceptable value is a maximum acceptable first value, further including second coincidence means responsive to said temperature sensing means determining the temperature of the mixture to be a minimum high temperature or above and to said viscosity sensing means determining the viscosity of the mixture to be at or above a maximum acceptable second value of viscosity, for activating said valve means to admit water to the mixture until the viscosity thereof is reduced to a value below the maximum acceptable second value, whereupon said viscosity sensing means disables said second coincidence means, thereby de-activating said valve means.

4. Battery paste making equipment according to claim 3 wherein said timing means includes switch means connected in series with the first-mentioned coincidence means to disable it upon the termination of said predetermined time interval.

5. Battery paste making equipment according to claim 3 further including recycle timing means responsive to the first-mentioned and said second coincidence means for turning on and off repeatedly said valve means so that a series of bursts of water are supplied to the mixture.

6. Battery paste making equipment according to claim 5 wherein said recycle timing means produces a timing signal having an initial delay off cycle followed by a series of pulses separated by dispersion off cycles, said valve means being activated in response to said pulses and being de-activated during the off cycles.

7. Battery paste making equipment according to claim 5 or 6 further including delay means associated with said valve means for enabling said valve means to remain activated for a predetermined time delay interval independently of the viscosity condition of the mixture when said valve means is activated initially.

8. Battery paste making equipment according to claim 7 wherein said delay means includes a pipe connected in fluid communication with the outlet of said valve means for delivering water therefrom to the mixture, said pipe being of a predetermined length to provide said predetermined time delay interval and being inclined downwardly away from said valve means.

9. Battery paste making equipment according to claim 5 further including means for counting the number of bursts of water delivered to the mixture and for de-activating said valve means in response to counting a predetermined number of bursts of water.

10. Battery paste making equipment according to claim 9 further including alarm means responsive to said counting means for generating an attention-attracting signal.

11. Battery paste making equipment according to claim 10 wherein said alarm means includes a horn for generating an audible alarm signal and a lamp for generating a visual alarm signal.

12. Battery paste making equipment according to claim 3 further including automatic switch means for energizing the first-mentioned and said second coincidence means to provide for an automatic mode of operation, and manual switch means connected in parallel with the first-mentioned and said second coincidence means for overriding them to provide for a manual mode of operation.

13. In a method of making battery paste by mixing selected quantities of lead oxide and water to form a mixture the viscosity of which ascends on a time-viscosity curve, and then admixing a selected quantity of sulfuric acid to form a reaction mixture the viscosity of which initially descends on such curve, the curve then changing in slope to reach a point of minimum viscosity, the temperature of said reaction mixture forming a time-temperature curve having a temperature peak therein at a time subsequent to acid addition, the steps which comprise:

sensing the temperature of said reaction mixture,
sensing the viscosity of said reaction mixture, and
adding a quantity of water to the reaction mixture when the temperature thereof rises to a predetermined temperature or above and the viscosity thereof is at or above a predetermined value, until the viscosity is reduced to a value below the predetermined value,
said predetermined temperature corresponding approximately to at least one of (a) a temperature at which a predetermined time-viscosity curve reaches a point adjacent to said minimum viscosity, and (b) a temperature at a point on a predetermined time-temperature curve which corresponds to said predetermined time-viscosity curve, at a point adjacent to and below its peak, whereby the water content of the reaction mixture is adjusted so as to approximate the water content desired in the final product.

14. The method of making battery paste according to claim 13 further including the steps of adding the water in bursts, counting the number of bursts of water, and terminating said adding a quantity of water if the viscosity has not been reduced to a value below the predetermined value in response to the counting of a predetermined number of bursts of water.

15. The method of making a battery paste according to claim 14 further including the steps of generating an attention-attracting alarm signal in response to the counting of a predetermined number of bursts of water.

* * * * *